(12) United States Patent
Coughlin (10) Patent No.: US 8,290,697 B2
(45) Date of Patent: Oct. 16, 2012

(54) HAPTIC APPARATUS AND COACHING METHOD FOR IMPROVING VEHICLE FUEL ECONOMY

(75) Inventor: Bill Coughlin, Harrison Township, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 113 days.

(21) Appl. No.: 12/575,262

(22) Filed: Oct. 7, 2009

(65) Prior Publication Data

US 2010/0030458 A1    Feb. 4, 2010

Related U.S. Application Data

(63) Continuation of application No. 11/420,249, filed on May 25, 2006, now Pat. No. 7,603,228.

(51) Int. Cl.
*G06F 19/00* (2011.01)
(52) U.S. Cl. .......... 701/123; 701/301; 701/45; 715/701; 345/157
(58) Field of Classification Search .................. 701/123, 701/301, 45; 715/701; 345/157
See application file for complete search history.

(56) References Cited

U.S. PATENT DOCUMENTS

| | | | |
|---|---|---|---|
| 2,692,980 A | 10/1954 | Platt | |
| 2,825,418 A | 3/1958 | Kershman | |
| 4,019,475 A | 4/1977 | Nuss | |
| 4,385,604 A | 5/1983 | Fiala | |
| 5,080,207 A | 1/1992 | Horneffer | |
| 5,113,721 A * | 5/1992 | Polly | 477/80 |
| 5,166,879 A | 11/1992 | Greene et al. | |
| 5,378,052 A | 1/1995 | Yoshino | |
| 5,627,752 A * | 5/1997 | Buck et al. | 701/36 |

(Continued)

FOREIGN PATENT DOCUMENTS

CN    1671578 A    9/2005

(Continued)

OTHER PUBLICATIONS

Ming & Sure Intellectual Property Law Firm, letter dated Mar. 26, 2010 summarizing Examiner's brief opinions of the First Office Action.

(Continued)

*Primary Examiner* — Thomas Black
*Assistant Examiner* — Wae Louie
(74) *Attorney, Agent, or Firm* — David B. Kelley; Brooks Kushman P.C.

(57) ABSTRACT

An apparatus is disclosed that includes a haptic actuator operatively associated with a pedal assembly of the vehicle, a human-machine interface (HMI) for enabling the driver to select between a plurality of fuel savings settings, and a controller coupled to a data interface in the vehicle and the HMI interface for causing the haptic actuator to provide feedback to the driver when an aspect of vehicle operation crosses at least one of a plurality of speed and acceleration thresholds responsive to the HMI setting. Additionally, a coaching method provides haptic-based feedback that will not interfere with the operation of the vehicle. This method of closed-loop feedback provides a timely signal to the driver in a way that will encourage a change in driver style over time, such as backing off the accelerator pedal to accelerate at a lower rate and braking earlier with less intensity. As not all driver preferences are the same under all conditions, the HMI selector will help coach the driver by providing feedback that best fits their driving preference at the particular time.

16 Claims, 6 Drawing Sheets

U.S. PATENT DOCUMENTS

| | | | |
|---|---|---|---|
| 5,693,876 | A | 12/1997 | Ghitea et al. |
| 5,897,437 | A | 4/1999 | Nishiumi et al. |
| 6,085,725 | A | 7/2000 | Goode et al. |
| 6,092,021 | A * | 7/2000 | Ehlbeck et al. ............... 701/123 |
| 6,188,945 | B1 | 2/2001 | Graf et al. |
| 6,289,332 | B2 | 9/2001 | Menig et al. |
| 6,295,500 | B1 | 9/2001 | Cullen et al. |
| 6,298,745 | B1 | 10/2001 | Rixon et al. |
| 6,309,031 | B1 | 10/2001 | Crombez et al. |
| 6,366,848 | B1 * | 4/2002 | Gustavsson ................... 701/123 |
| 6,377,884 | B1 | 4/2002 | Loeffler et al. |
| 6,470,256 | B1 | 10/2002 | Cikalo et al. |
| 6,487,477 | B1 * | 11/2002 | Woestman et al. ............. 701/22 |
| 6,507,782 | B1 * | 1/2003 | Rumbo et al. ................. 701/121 |
| 6,580,417 | B2 * | 6/2003 | Rosenberg et al. ............ 345/157 |
| 6,580,973 | B2 * | 6/2003 | Leivian et al. ..................... 701/1 |
| 6,655,199 | B1 | 12/2003 | Smith |
| 6,693,622 | B1 | 2/2004 | Shaholan et al. |
| 6,708,099 | B2 * | 3/2004 | Tellis et al. ..................... 701/96 |
| 6,739,212 | B2 | 5/2004 | Flynn |
| 6,751,544 | B2 * | 6/2004 | Hashimoto et al. ........... 701/107 |
| 6,882,915 | B2 * | 4/2005 | Yamamura et al. ............. 701/45 |
| 6,904,823 | B2 * | 6/2005 | Levin et al. ............... 74/471 XY |
| 6,907,325 | B1 | 6/2005 | Syed et al. |
| 6,909,947 | B2 * | 6/2005 | Douros et al. ............... 701/34.4 |
| 6,925,425 | B2 * | 8/2005 | Remboski et al. ............ 702/188 |
| 6,999,360 | B2 | 2/2006 | Komura |
| 7,006,917 | B2 * | 2/2006 | Hijikata ........................ 701/301 |
| 7,013,213 | B2 | 3/2006 | McGee et al. |
| 7,096,852 | B2 * | 8/2006 | Gregorio ....................... 123/399 |
| 7,162,349 | B2 * | 1/2007 | Hijikata et al. ................. 701/70 |
| 7,305,300 | B2 | 12/2007 | Gibson et al. |
| 7,391,305 | B2 * | 6/2008 | Knoll et al. ................... 340/438 |
| 7,403,842 | B2 * | 7/2008 | Yamamura et al. ............... 701/1 |
| 7,499,787 | B2 | 3/2009 | Hrovat et al. |
| 7,565,230 | B2 * | 7/2009 | Gardner et al. ............. 701/32.7 |
| 7,603,228 | B2 * | 10/2009 | Coughlin ...................... 701/123 |
| 7,609,150 | B2 * | 10/2009 | Wheatley et al. ............. 340/436 |
| 7,646,289 | B2 | 1/2010 | Tamai et al. |
| 7,798,578 | B2 * | 9/2010 | Lewis et al. ................... 303/151 |
| 7,946,271 | B2 * | 5/2011 | Gregorio ....................... 123/396 |
| 2001/0030658 | A1 * | 10/2001 | Rosenberg et al. ........... 345/701 |
| 2001/0039230 | A1 | 11/2001 | Severinsky et al. |
| 2002/0091473 | A1 * | 7/2002 | Gardner et al. ................. 701/35 |
| 2002/0095247 | A1 | 7/2002 | Ding et al. |
| 2002/0116156 | A1 | 8/2002 | Remboski et al. |
| 2002/0120371 | A1 * | 8/2002 | Leivian et al. ..................... 701/1 |
| 2002/0120374 | A1 * | 8/2002 | Douros et al. ................... 701/29 |
| 2002/0151297 | A1 * | 10/2002 | Remboski et al. ............ 455/414 |
| 2002/0171541 | A1 | 11/2002 | Crombez et al. |
| 2003/0168266 | A1 | 9/2003 | Sasaki et al. |
| 2003/0188594 | A1 * | 10/2003 | Levin et al. ................. 74/473.12 |
| 2003/0191573 | A1 * | 10/2003 | Beyer et al. ..................... 701/70 |
| 2004/0249533 | A1 | 12/2004 | Wheals et al. |
| 2005/0021226 | A1 | 1/2005 | Kustosch |
| 2005/0110348 | A1 | 5/2005 | Hijikata et al. |
| 2005/0256632 | A1 | 11/2005 | McGee et al. |
| 2006/0109098 | A1 | 5/2006 | Grill et al. |
| 2006/0181409 | A1 | 8/2006 | Yamamoto et al. |
| 2007/0013498 | A1 * | 1/2007 | Knoll et al. ................... 340/438 |
| 2007/0085667 | A1 * | 4/2007 | Cicilloni et al. ............. 340/435 |
| 2007/0271026 | A1 | 11/2007 | Hijikata |
| 2007/0276582 | A1 * | 11/2007 | Coughlin ...................... 701/123 |
| 2008/0015767 | A1 | 1/2008 | Masuda et al. |
| 2008/0042489 | A1 * | 2/2008 | Lewis et al. ................... 303/152 |
| 2009/0132141 | A1 | 5/2009 | Hrovat et al. |
| 2010/0030458 | A1 * | 2/2010 | Coughlin ...................... 701/123 |
| 2011/0102166 | A1 * | 5/2011 | Filev et al. .................... 340/435 |
| 2011/0106334 | A1 * | 5/2011 | Filev et al. ......................... 701/1 |
| 2011/0172864 | A1 * | 7/2011 | Syed et al. ...................... 701/22 |
| 2011/0193693 | A1 * | 8/2011 | Filev et al. .................... 340/435 |

FOREIGN PATENT DOCUMENTS

| | | |
|---|---|---|
| DE | 10218012 | 11/2003 |
| DE | 10218012 A1 | 11/2003 |
| DE | 102004010960 A1 | 10/2004 |
| FR | 2828155 | 2/2003 |
| JP | 2002370560 | 12/2002 |
| JP | 2003120339 | 4/2003 |
| JP | 2003335151 | 11/2003 |
| JP | 2003343305 | 12/2003 |
| JP | 2004314871 | 11/2004 |
| JP | 2005132225 | 5/2005 |
| JP | 2006316629 | 11/2006 |
| JP | 2007076468 | 3/2007 |
| JP | 2007182196 | 7/2007 |
| WO | 2004/087484 | 10/2004 |

OTHER PUBLICATIONS

The State Intellectual Property Office of P.R. China, English Translation of the First Office Action and Text of the First Office Action issued Mar. 1, 2010 for the corresponding Chinese Patent Application No. 200780017580.3.

Ming & Sure Intellectual Property Law Firm, The First Office Action in Chinese for Chinese Patent Application No. 200780017580.3 mailed Mar. 1, 2010.

DE Office Action for Serial No. 10 2008 039 328.2 26 dated Jun. 15, 2010.

GB Search Report for the corresponding Patent Application No. GB 0819741.0 mailed Jan. 26, 2009.

Drivers, beware so-called gas aid gadgets, detnews.com, Jul. 3, 2007.

FTC Facts for Consumers, "Gas Saving" Products: Fact of Fuelishness? Sep. 2006.

OBD2AllInOne.com, May 4, 2006.

1975 AMC Pacer Home Page, 1975 Pacer by American Motors Corporation AMC Coupe 1976 1977 1978 1979 1980.

Symbiotic Car: Haptic Feedback Accelerator Pedal, Volkswagen of America Electronics Research Lab.

Driving Tips, Edmunds.com, Apr. 27, 2006.

Top Tips for Fuel Efficient Driving, Shell., com, Apr. 24, 2006.

Driving Skills, drivingskillsforlife.com, May 22, 2006.

Guenter Reichart et al., Potentials of BMW Driver Assistance to Improve Fuel Economy.

The online description of a low cost OBD2 All-One Scan Tool from OBD Diagnostic, Inc., available at : www.obd2allinone.com.

An online article from the New Scientist on Mar. 22, 2004, entitled "Vibrating pedal says 'ease off gas" available at http://www.newscientist.com/article.ns?id=dn4787.

An online report from a Stanford University class entitled "Symbiotic Car: Haptic Feedback Accelerator Pedal" available at: http://wikibox.stanford.edu/docushare2003/dsweb/Get/Document-7280/VW03-04.pdf.

An online article from Edmunds.com entitled "We Test the Tips—What Really Saves Gas? And How Much?" available at http://www.edmunds.com/ownership/driving/articles/106842/article.html.

An online article from Shell.com entitled "Top tips for fuel efficient driving" available at: http://www.shell/comhome/Framework?site!d=media-enFC2=/media-en/html/iwgen/feature_stories/2006/zzz_lhn.html&FC3=/media-en/html/iwgen/feature_stories/2206/fuel_efficiency_tips_17012006.html.

Pages from an online module entitled Eco-Driving available at: http://www.drivingskillsforlife.com/content/view/3/14/lang.en.

On some GM cars in the past, they had a "Speed Minder" buzzer/alarm feature. This feature came with a knob on the instrument panel that would move an additional needle on the speedometer to a speed that the driver wanted the buzzer to sound if it was exceeded.

It is possible that some vehicles decades ago may have had a fuel economy light, such as referred to at: http://faculty.concord.edu/chrisz/hobby/75-Pacer-1.html.

"Nissan ECO pedal technology to increase fuel efficiency by 5-10 percent," Aug. 4, 2008, Zach Gale, Motor Trend, Automotive News.

"Continental produces the first accelerator pedal that communicates with the driver," Frankfurt Am Main, Germany, Aug. 11, 2008, Press release for the trade press.

Dipl.-Ing Gunter Reichart et al., Potentials of BMW Driver Assistance to Improve Fuel Economy, 16 pages.

Extended European Search Report for EP 07 81 1931.0 dated Oct. 4, 2010.

* cited by examiner

HAPTIC APPARATUS AND COACHING METHOD FOR IMPROVING VEHICLE FUEL ECONOMY

CROSS-REFERENCE TO RELATED APPLICATIONS

This application is a continuation of U.S. application Ser. No. 11/420,249 filed May 25, 2006 (now U.S. Pat. No. 7,603, 228) which is hereby incorporated by reference in its entirety.

BACKGROUND

1. Technical Field

The present specification relates to generally to motor vehicles and specifically to a haptic apparatus and coaching method for providing feedback to the driver that will enable and encourage the driver to improve the fuel economy of the vehicle.

2. Background Art

Auto companies expend enormous effort calibrating their vehicle engines to achieve an optimum level of performance relative to driver expectation. Horsepower, torque, and fuel economy are balanced across a complex set of operating circumstances prior to governmental certification. However, the way in which a vehicle is driven can have a considerable impact on fuel economy. For example, the 2006 model of the Ford F-150 4×4 5.4 L pickup truck has an EPA rating of 14 mpg in the city, 18 mpg on the highway and 16 mpg for a combination of city and highway driving. Yet, through judicious driving, it is possible to achieve more than 20 mpg in a real-world mix of city and highway driving. In other words, a fuel economy improvement of over 25% from the average can be achieved by a driver who wants to improve fuel economy. In comparison, GM announced on Apr. 30, 2006 that its 2008 model dual-mode hybrid Tahoe SUV will achieve 25% better fuel economy in combined city and highway driving over its conventional Tahoe SUV. While clearly not an apples-to-apples comparison, it should be appreciated that a more carefully controlled driving style can achieve a meaningful fuel economy benefit without any added cost.

Tips for fuel efficient driving can easily be found on the Internet. For example, Shell Oil's Media Centre site states that aggressive driving can use as much as a third more fuel than sensible driving. This is analogous to rolling back the price of gasoline from $3/gallon to $2.25/gallon for an aggressive driver who adopts a more sensible driving style. In this regard, consumers are recommended to avoid accelerating or braking too hard, use cruise control, turn off the engine when waiting in a queue and so forth. Similarly, edmunds.com includes an article entitled "Driving Tips" that asserts up to 37% better fuel economy can be achieved through a change in driving habits (with an average savings of 31%). Their recommendations are similar to those by Shell, and specific fuel economy improvements are provided for each tip. For example, driving at a lower speed is said to achieve an average fuel economy savings of 12%, while using cruise control is said to achieve an average fuel savings of 7%. However, as pointed out in the Eco-Driving tips on the Ford Motor Company sponsored site www.drivingskillsforlife.com, cruise control should not be used on hilly terrain where the goal is to maximize fuel economy. The Eco-Driving module from this site provides a considerable amount of information in support of environmentally friendly driving. For example, the Eco-Driving module states that fuel consumption increases rapidly at speeds above 60 mph and that acceleration accounts for nearly 50% of a vehicle's energy consumption in city driving conditions. While such general driving tips are unquestionably instructive, drivers are still essentially left on their own to guess how best to increase the fuel economy for their specific vehicles in any number of different driving situations.

Some automakers have offered models where the driver could switch between different modes of powertrain operation. However, this is typically achieved by adjusting the shift points of the transmission, and the goal is to increase power at the expense of fuel economy. In contrast, a control method for fuel economy has been proposed in German Patent Application Publication No. DE10218012. Under this approach, the driver is able to set a variable for fuel consumption and the onboard control system will then seek to achieve it. However, this may lead to changes in vehicle performance that do not meet with driver expectation.

While most drivers understand that quick accelerations and high speeds hurt fuel economy, vehicles today are not adequately equipped to help the driver improve fuel economy. Typically, a sliding-scale gauge or numerical mpg display is all that is provided to give the driver an indication of instantaneous or average fuel economy. Such indicators can be easily ignored by the driver. Additionally, in some vehicles equipped with a standard (stick-shift) transmission, a shift light has been provided to enable the driver to know when to shift gears without having to look at the tachometer. But, shifting is only one aspect of driving style and a shift light may not be the best way to communicate with the driver.

Visual displays have also been recommended in the patent art. For example, Japanese Patent Publication No. JP2002370560 recommends the use of an instrument cluster or navigational display to indicate an optimum accelerator pedaling value to the driver. Such a solution would require that the driver repeatedly alternate his or her focus from the road to the in-vehicle display and back again in an attempt to achieve the optimum value displayed. Another visual display approached is recommended in U.S. Pat. No. 6,092,021. In this case, prompting messages are displayed when inefficient fuel use is detected, such as "DRIVE STEADY SPEED." However, such commands may not exactly lead to customer satisfaction, and by definition, these message arrive after the fact.

Some announcements have also been made by automakers about their experiments to help drivers, but as yet no commercially available solution exists for consumers. For example, The New Scientist reported on Mar. 22, 2004 that DaimlerChrysler was experimenting with a vibrating accelerator pedal to alert a driver when to slow down. The prototype was said to use GPS to anticipate a curve in the road ahead, vehicle-detecting radar to help avoid getting too close to any vehicle in the front, a PC to assimilate these measurements and a small actuator fixed under the accelerator pedal to lightly vibrate a small piston against the underside of the pedal rubber when it was time to decelerate. Vibration alert was chosen, because DaimlerChrysler found that drivers would react much faster to a vibration than they would to a dashboard light.

Another experiment was conducted by Volkswagen of America and Stanford University in a 2003-2004 project entitled "Symbiotic Car: Haptic Feedback Accelerator Pedal." In this case, the driver was able to select between a fuel economy mode, a performance shifting mode, and a speeding/tailgating mode using a control interface in a 2003 VW GTI VR6. Based on the detected vehicle speed and engine speed, a software program determined the appropriate haptic output: a force against the driver's foot if he or she was speeding and vibration cues if the system was in shifting mode. The prototype system included a DC motor and cable assembly that would pull on the accelerator pedal in order to induce a force opposing the driver's foot. A microcontroller would send a signal to the motor specifying which type of haptic feedback to create, whether to create a vibration (~49 Hz) or a continuous force (zero to five pounds) sensation at the accelerator pedal. The motor was mounted above the gas pedal. A cable was attached to around a gear head mounted on the motor's shaft and was connected to the gas pedal using an eyebolt. The results of this experiment indicated that the drivers liked having the shifting points cued to them only if they could choose the shift point.

Of course, the concept of vibrating the accelerator pedal can also be found in the patent art, such as U.S. Pat. Nos. 5,113,721 and 6,925,425, French Patent Application Publication No. FR2828155, and U.S. Patent Application Publication Nos. 2005/0110348 and 2005/0021226. However, the lack of a commercially available solution in the market today indicates that the problem to solve is complex. For example, the solution must be effective to increase fuel economy, but not so intrusive as to discourage use or adversely impact customer satisfaction. As Ford's patented BeltMinder™ system has demonstrated, invention is often necessary to encourage the use of even a device as beneficial as a seatbelt. The solution should also be capable of causing more than a temporary change in driving style, while still giving the driver an exhilarating experience. The solution should also be applicable to current production vehicles, as well as to millions of vehicles that are already in use. The solution should be easy to use, not need to interfere with normal vehicle operation, be inexpensive to install and not require recertification of the vehicle or a violation of the vehicle's warranty. Additionally, the solution should not distract the driver or require constant attention by the driver to achieve its fuel economy goal. Ideally, the solution will enable a consumer to purchase a vehicle large enough for their needs, but also enable the driver to operate the vehicle in a way that approaches the fuel efficiency of a smaller vehicle. In other words, the solution should be such as to enable the driver to retain and always be able to use all of the powertrain capability of the vehicle whenever required, but not leave the driver to guess how best to increase fuel economy otherwise.

Accordingly, a haptic apparatus and coaching method are advantageously provided to enable and encourage the driver to improve the fuel economy of the vehicle—without having to take control away from the driver.

It is also an advantage that this haptic apparatus that can be installed in millions of existing vehicles, as well as in future production vehicles.

It is another advantage that the haptic apparatus and coaching method will help promote safe driving habits, as well as reduce brake and tire wear.

It is a further advantage that the haptic apparatus and coaching method will self adjust to the specific vehicle being driven.

It is yet another advantage that the haptic apparatus and coaching method will enable the driver to adjust the level of fuel economy desired to be achieved without requiring the vehicle to be recertified.

SUMMARY

In order to achieve the foregoing advantages, an apparatus is provided that includes a haptic actuator operatively associated with a pedal assembly of the vehicle, a human-machine interface (HMI) for enabling the driver to select between a plurality of fuel savings settings, and a controller configured to provide coaching feedback to the driver through the haptic actuator when the vehicle crosses at least one of a plurality of speed and acceleration thresholds responsive to the HMI setting. Additionally, the advantageous coaching method provides haptic-based feedback that will not interfere with the operation of the vehicle. Rather, this method of closed-loop feedback provides a timely signal to the driver in a way that will encourage a change in driver style over time, such as backing off the accelerator pedal to accelerate at a lower rate and braking earlier with less intensity. As not all driver preferences are the same under all conditions, the HMI selector will help coach the driver by providing feedback that best fits their driving preference at the particular time.

The above features and advantages, as well as others, will be readily apparent from the following detailed description of the preferred embodiments. Further advantages and features will be seen from the drawings, which are summarized briefly below:

DETAILED DESCRIPTION

Figure 1:
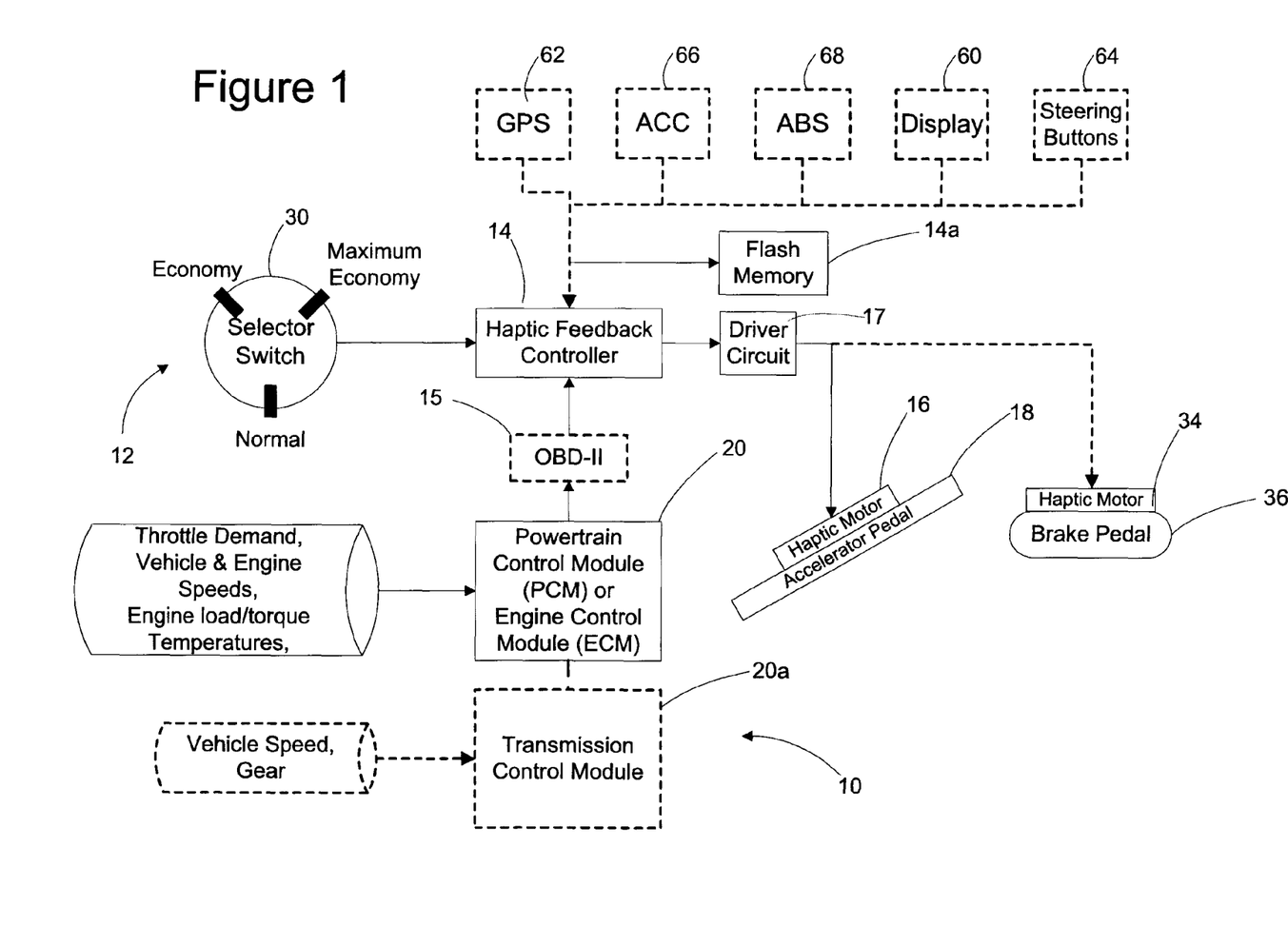
FIG. 1 is a block diagram of a vehicle system that includes the haptic apparatus described herein.

Referring to FIG. 1, a block diagram of a vehicle system 10 is shown. The vehicle system 10 features a haptic apparatus 12 having the advantages summarized above. The haptic apparatus 12 includes an electronic control unit (ECU) or microcontroller 14 and at least one motor 16 operatively associated with the accelerator pedal 18. While the microcontroller 14 could be a separate module, this functionality could instead be incorporated into the powertrain or engine control module 20 instead. A transmission control module 20a is also shown to illustrate that separate engine and transmission control modules may be provided. Given that a driver can only respond so quickly to computer-based coaching feedback, the additional load due to the functionality of microcontroller 14 may be insignificant relative to other functions of the engine control module. One example of a suitable embodiment for microcontroller 14 is the Texas Instruments TMS470R1B1M 16/32-Bit RISC microcontroller chip. This microcontroller chip features one megabyte of flash memory and two Controller Area Network (CAN) controllers. The CAN bus protocol is used in many vehicle systems today. However, the haptic apparatus being disclosed is not limited to any particular bus structure or protocol. FIG. 1 also shows a flash memory circuit 14*a* connected to the microcontroller 14, as other suitable microcontrollers may not be equipped with non-volatile memory that can be used for recording events and other data. Whether or not the functionality of the microcontroller 14 is integrated into the engine control module 20 or some other controller onboard the vehicle, the microcontroller will have the coaching method programmed into its associated memory. This method will be described later in connection with FIG. 8. In a dealer service context, it may be appropriate to upload the software instructions containing this method into an existing onboard controller equipped with flash or EEPROM-based memory. In any event, it should be understood that a suitable controller in the vehicle system is configured to provide the coaching feedback method described herein.

Figure 2:
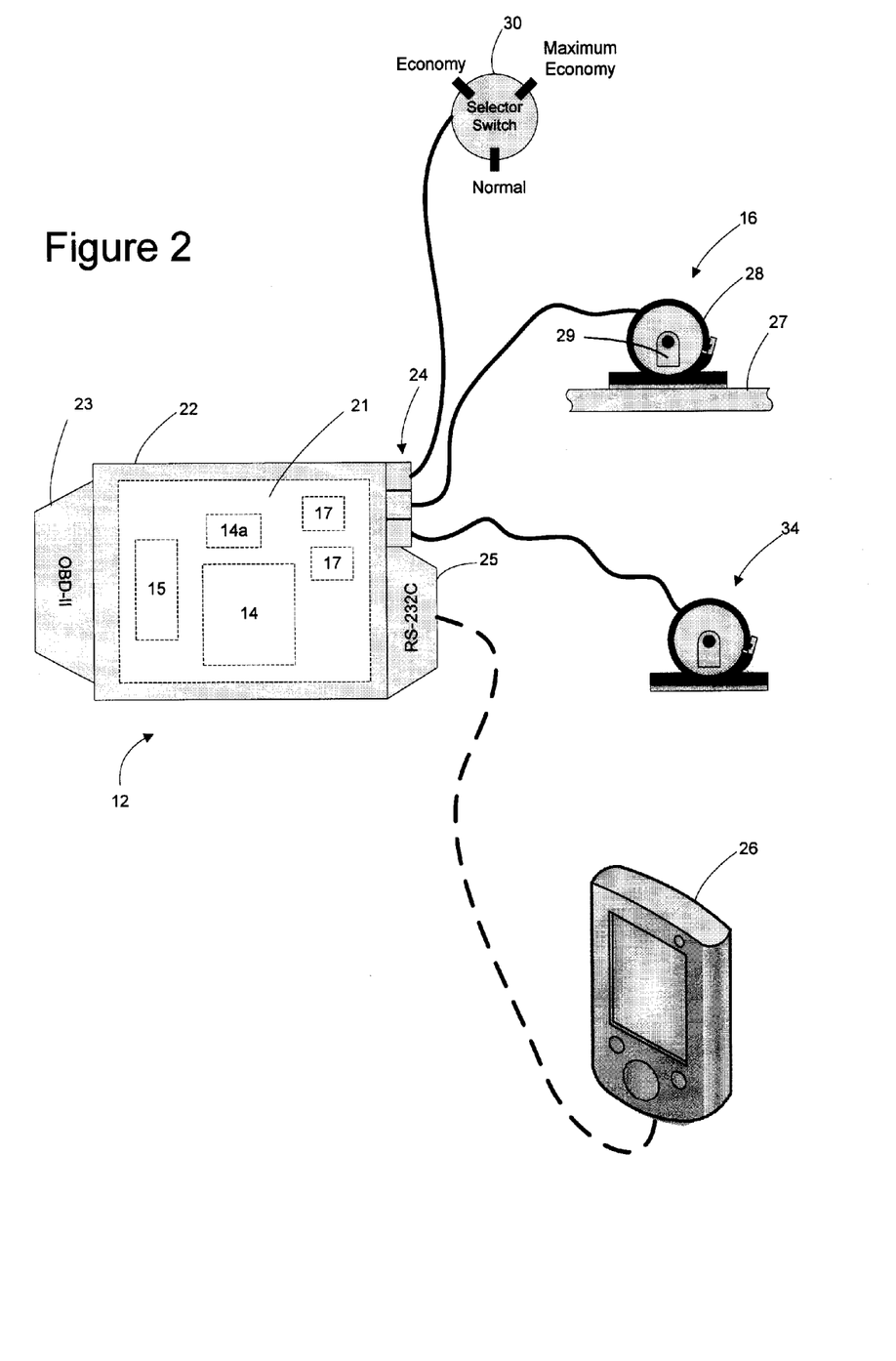
FIG. 2 is a diagrammatic representation of an aftermarket embodiment for the haptic apparatus.

In an aftermarket embodiment shown primarily in FIG. 2, the microcontroller 14 is coupled to the powertrain control module 20 through an OBD-II data port interface 15. OBD-II refers to an automotive standard in the U.S. for onboard diagnostics that requires the provision of a standard 16-pin connector accessible in the vehicle's cabin generally below the steering wheel. DC power is even made available through this onboard connector. While a connection directly to the CAN bus onboard the vehicle is an alternative in an aftermarket embodiment, it should be appreciated that the standard OBD-II connector provides a simple and low-cost point of connection specifically designed to provide an appropriately isolated data port. It should also be noted that a similar data port exists in Europe under the European Onboard Diagnostic (EOBD) standard.

As illustrated in FIG. 2, the OBD-II data interface 15, the microcontroller 14 and a motor driver circuit 17 are preferably mounted on a circuit board 21 that is housed in a module enclosure 22 with a mating OBD-II connector 23 at one end an output interface 24 at the other end. While the connector 23 is shown attached to the enclosure 22, it should be appreciated that the connector 23 could alternatively be coupled to the enclosure via a ribbon cable or the like. An example of a commercially available OBD-II interface product having a circuit board therein is the T16-002 interface from Multiplex Engineering, Inc. of Goleta, Calif. Elm Electronics of Toronto Canada also provides a ELM320-OBD (PWM) to RS232 Interpreter circuit that forms the basis of several OBD-II data interfaces, such as the All-In-One scan tool from OBD Diagnostics, Inc. of Redondo Beach, Calif. The output interface 24 preferably includes a connector to provide a communication output, such as RS-232C connector 25. An RS-232C connection is typically used with OBD-II scan tools for connecting to a computer or a personal data assistant device like PDA 26. While a removable wired connection to PDA 26 is shown in FIG. 2, it should be appreciated that wireless communication may also be employed, such as through a Bluetooth transceiver available from AutoEnginuity, L.L.C. of Mesa, Ariz. (see www.autoenginuity.com). Additionally, the functionality of switch 30 could be incorporated into a software program for PDA 26 as an alternative aftermarket package.

It should be appreciated that the embodiment of haptic apparatus 12 in FIG. 2 may be packaged and sold as an aftermarket unit for quick and proper installation (with or without PDA 26), preferably at an authorized dealer. The motor 16 may be mounted at an appropriate location on the accelerator pedal itself, such as the back side thereof, or at any other location operatively associated with the accelerator pedal, so that the driver is able to receive haptic feedback through the accelerator pedal. For example, the motor 16 may be secured to a stationary bracket 27 that forms part of the accelerator pedal assembly via an adhesive-backed plastic mounting clip 28. Of course, other suitable mounting techniques may be used in the appropriate application, but quick connectors are generally preferred to keep installation costs low, such as with snap-in locking tangs. For example, in the appropriate application, a Velcro® hook and loop fastener could be used, which would enable an aftermarket apparatus 12 to easily be transferable to another vehicle. Such a reusable mounting technique may be particularly beneficial with a leased vehicle, as the apparatus may be reconfigured for use on another vehicle through updated software.

As shown in FIG. 1, the motor driver circuit 17 is electrically coupled between the microcontroller 14 and the haptic motor 16. The motor driver circuit 17 is used to apply electrical power to and thereby energize the haptic motor 16 in response to an output signal from the microcontroller 14. Additionally, as illustrated in FIG. 2, a separate driver circuit 17 may be used to energize a haptic motor 34 for the brake pedal 36. The motor driver circuit 17 may be any suitable circuit capable of selectively applying sufficient electrical power to the haptic motor 16. An exemplary motor driver circuit is illustrated in FIG. 15 of U.S. Pat. No. 5,897,437 issued on Apr. 27, 1999 to Nishiumi et al., entitled "Controller Pack." This patent is hereby incorporated by reference.

The goal of the motor 16 is to provide a sufficient magnitude of haptic feedback to be perceptible, but not distractive to the driver. Said another way, the goal is to inform the driver, not necessarily be such as to command the driver's immediate attention. Thus, for example, a driver may react over time on an almost subconscious level to slightly release pressure on the accelerator pedal in response to a gentle vibration from motor 16. As demonstrated by the vibration motor in a typical cellular phone, the motor 16 can be quite small and still very effective. Additionally, as exemplified by U.S. Pat. No. 6,693,622, issued on Feb. 17, 2004 and assigned to Immersion Corp., entitled "Vibrotactile Haptic Feedback Devices," consumers are becoming used to vibrotactile devices, such as in a force feedback game pad controller. A wide variety of vibration motors may be used for motor 16, such as vibrator motor 4SH3-0212B from China Jinlong Holdings Group or even a 1.5 to 3 VDC motor (model 273-223) from Radio Shack with an eccentric mass 29 attached to its rotor. Other types of vibration motors are based upon piezoelectric, solenoid or electromagnetic operation, such as the Alps Electric ForceReactor™ AF series short-vibration feedback device. However, it should be appreciated that the haptic apparatus being disclosed is not limited to vibration motors per se. Other tactile feedback or other sense-of-touch feedback actuators may be suitable for this application, providing that they do not adversely interfere with the operation of the accelerator pedal or cause the driver to overreact. For example, in a vehicle equipped with adjustable pedals, a rapid toggling back and forth of the motor that adjusts the movement of the accelerator and brake pedal assembly can be perceived as a haptic signal to the driver without changing vehicle operation. In other words, in some applications, a single motor may be used to provide haptic feedback through both the accelerator and brake pedals.

As disclosed herein, the vehicle driver determines how much driving style guidance or coaching is provided by the haptic apparatus 12. For example, the driver may want or need to achieve the highest fuel economy reasonably possible during one particular trip or time interval, but the same driver may be willing to accept a lesser degree of fuel economy during another trip or time interval. Thus, in accordance with one embodiment, a human-machine interface (HMI) is coupled to microcontroller 14 in the form of a three-position selector switch 30. The switch 30 enables the driver to select between a normal mode of operation, an economy mode of operation and an even higher economy mode of operation. In the normal mode of operation, no haptic feedback need be provided by apparatus 12. In the higher economy mode of operation, haptic feedback will be provided to the driver that is best suited to achieving the highest practical fuel economy that can be achieved for the vehicle. However, not all drivers will want this level of feedback, as some drivers may want to accelerate more rapidly or drive at a higher highway speed, and so forth. Accordingly, at least one additional setting is provided by switch 30, labeled as the economy mode of operation. This intermediate setting will still encourage high fuel economy, but not seek to achieve highest practical fuel economy.

In one exemplary embodiment, the selector switch 30 is comprised an ITT Industries, Cannon C&K Rafix22QR illuminated rotary selector switch model number 1.30 242.136. This switch may be mounted to the instrument panel or any other suitable location that can be easily reached by the driver. It should also be appreciated that many other types of switches may be employed. For example, additional switch pole positions could be provided to provide more fine-tuning control for the driver, even to the extent of providing a continuously variable switch like that of the volume control on a radio. Alternatively, the operation of existing switches in the vehicle may be reprogrammed to provide the functionality of switch 30, such as the informational cluster 32 shown in FIG. 3. The cluster 32 includes a set of dash mounted buttons 38-42 and display 44. Such a cluster can be found in the 2006 Lincoln Mark LT pickup truck to display messages like those shown on display 44. These messages include ambient temperature, average fuel economy, the compass direction that the vehicle is heading, and the accumulated miles driven. By depressing Info button 38, the vehicle driver is able to cycle through a set of preprogrammed messages, such as the one illustrated. The Setup button 40 is used to make various preprogrammed selections, such as using English or metric units. The Reset button 42 is used to reset operations, such as the average fuel economy calculation.

Figure 3:
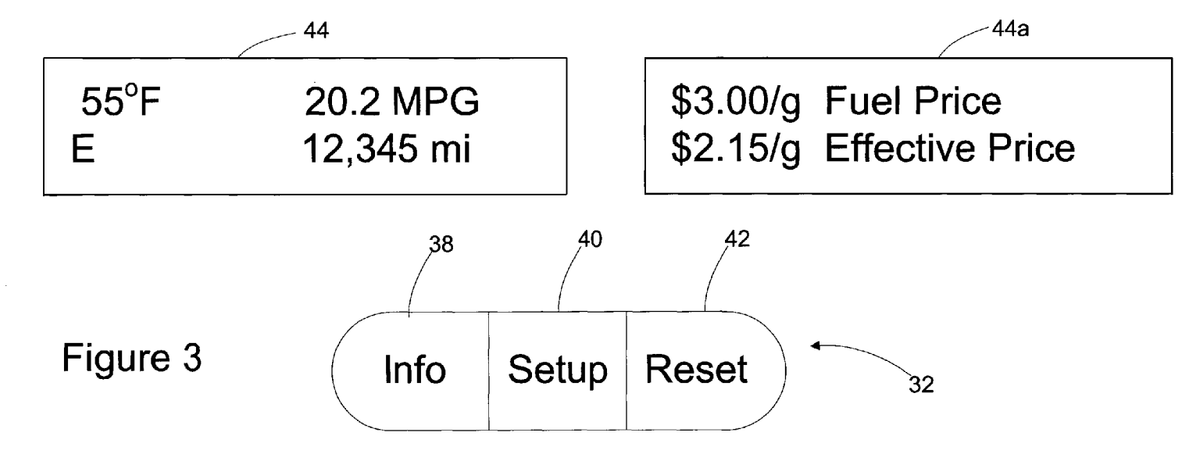
FIG. 3 is an illustration of an informational control arrangement for a vehicle instrument panel with two different messages being shown to demonstrate its utility as an HMI interface embodiment.

In another exemplary embodiment, the functionality of switch 30 may be added to the programming of cluster 32. In particular, one of the selections that may be made through the Setup button 40 would be to place the haptic apparatus 12 in either the fuel economy or higher economy mode of operation, or disable haptic coaching feedback in the normal mode of operation. The Reset button could then be used to restart calculations related to fuel economy messages to be displayed, as well as enable the entry of information by the driver. For example, when the vehicle is refueled, the driver could enter the approximate price of gasoline paid by selecting one of the prices programmed into the cluster (e.g., $2.5/g, $2.6/g and so forth). Then, the Info button 38 would be used to cycle through to one or more messages that convey visual feedback to the driver, such as shown on display 44a. In this regard, the driver could be given the positive feedback that even though $3/gallon was paid at the fuel pump, the apparatus 12 and coaching method has achieved an increase in fuel economy that effectively reduces the price paid. Other behavioral reinforcing messages could include an estimate of monthly or annual fuel cost savings, or even the money being saved per hour like a wage being earned through better driving habits. Preferably, visual feedback is used to positively convey behavioral reinforcing messages, while haptic feedback is used to subtlety convey fuel economy limits that the driver really wants to know.

Figure 4:
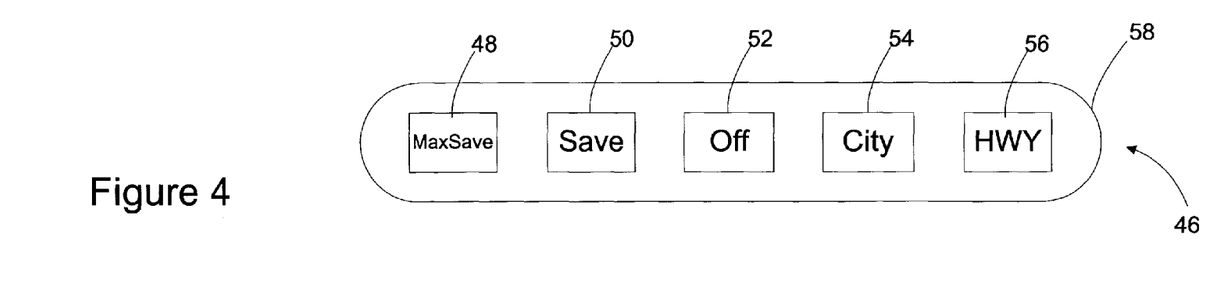
FIG. 4 is an illustration of another embodiment of an HMI interface.

FIG. 4 shows another type of switch assembly 46 that may be used as an appropriate HMI. The unitary switch assembly 46 includes five momentary push buttons 48-56 mounted in a plastic housing 58. The unitary switch assembly 46 could be constructed from the type of keyless entry keypad used on many Ford vehicles with a change in the button labels. One such keypad example is Ford part no. 3L2Z-14A626-AA, which also features wireless RF communication and an adhesive-backed mounting. Buttons 48-52 correspond to the three positions on switch 30. While buttons 54 and 56 could be used to provide additional intermediate fuel economy settings, they may alternatively be used to select either city or highway driving optimization in accordance with the coaching method. Even though the method shown in FIG. 8 demonstrates how the apparatus 12 is able to discern that highway optimization should be used, some users may prefer to have the ability to instruct which optimization mode should be employed.

Returning again to FIG. 1, a touch-screen display 60 in the vehicle, such as typically employed in connection with a GPS/navigation system 62, could alternatively be employed to incorporate the functionality of the switch 30. The functionality of the switch 30 could also be incorporated into a voice command system for the vehicle or the steering wheel buttons 64 as well. While the touch-screen display 60 could be used to provide visual feedback to the driver in addition to the haptic feedback, it should be appreciated that such visual feedback is not essential in every application. As in the case of display 60, all of the other optional elements of the vehicle system 10 are shown in phantom lines. Thus, for example, if the vehicle is equipped with an adaptive cruise control system (ACC) 66, then this information could be used to enable the haptic apparatus 12 to provide feedback to the driver when a greater separation between vehicles would be beneficial. An exemplary ACC system is disclosed in U.S. Pat. No. 6,708,099 issued on Mar. 16, 2004 and is assigned to a common assignee, entitled "Stop And Go Adaptive Cruise Control System." This patent is hereby incorporated by reference. Similarly, the antilock braking system (ABS) 68 could be used to provide braking intensity information to the haptic apparatus 12. Alternatively, braking force could be interpolated by monitoring the rate at which the vehicle is decelerating.

While it may not be optimal to provide haptic feedback to the driver during rapid braking, haptic feedback could be provided once the vehicle comes to a stop. Thus, for example, the motor 34 could provide a short vibration burst to indicate to the driver that a series of recent braking operations are consistent with an aggressive style of driving, rather than a conservative style of driving known to promote fuel efficiency and driving safety.

The coaching method will ideally be tuned to the particular operating characteristics of the vehicle that contains apparatus 12. For example, the rate at which a Ford F-150 can accelerate efficiently may well be different than the rate that a Ford Fusion can accelerate efficiently. The coaching method may also be tuned during the operation of the vehicle itself with the availability of additional information. For example, if the position and route of the vehicle is known, it may be determined that the vehicle has turned onto an entrance ramp of a highway and that rapid acceleration would be appropriate. Haptic feedback would not be particularly beneficial in such a case. Situations like this may also interpolated without resort to external information, such as from a sustained demand for rapid acceleration from a relatively slow speed.

Figure 5:
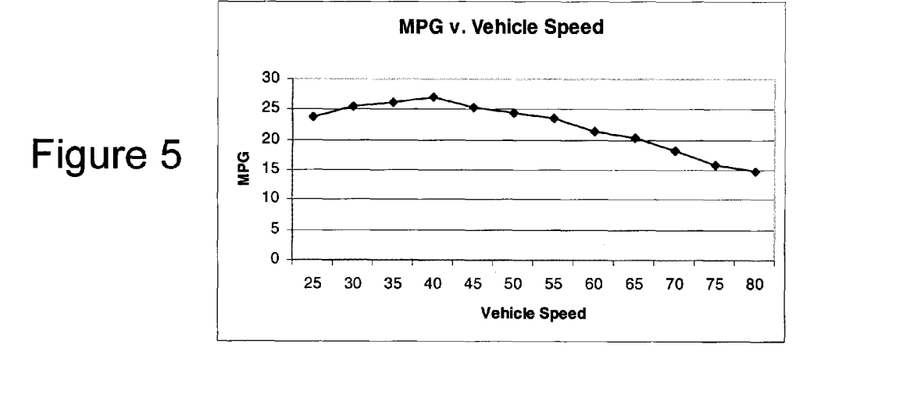
FIG. 5 is an exemplary graph of fuel economy over a range of speeds.

Referring to FIG. 5, a graph of fuel economy over a range of speeds is shown. This graph was taken from an exemplary test run of a 2006 Lincoln Mark LT pickup truck using the average fuel economy readout capability of this vehicle. Very briefly, once the speed of the vehicle was stabilized, the average fuel economy calculator was reset and the value recorded when the fuel economy reading became constant within 0.1 mpg. As illustrated in FIG. 5, the steady state fuel economy of a vehicle varies with speed (all other variables being constant, such as wind direction and the air conditioning system being off). The best fuel economy for this test run was found to be at 40 mph. Given that many city streets in the U.S. have a 45 mph speed limit, 40 mph could provide the appropriate speed setting for city driving optimization and the maximum fuel economy mode of operation. Similarly, 45 mph could provide the appropriate speed setting for city driving optimization and the intermediate fuel economy mode of operation. Thus, for example, in one exemplary embodiment, if the vehicle crosses the 40 mph threshold in the higher fuel economy mode of operation, the microcontroller 14 would cause the motor 16 to turn on and send its haptic vibration coaching signal to the driver. It should be noted that the trigger threshold could be more or less than optimal speed threshold if it produces a reaction in the driver to seek the optimal speed. In any event, the best trigger threshold will be one that enables the driver to avoid inefficient vehicle operation. In the event that the vehicle is being driven on a city street with a lower speed limit, a residential driving optimization routine could also be added, if not considered too intrusive.

While 40 mph is the optimum speed for city driving shown in the example of FIG. 5, the optimum speed for highway driving in this example is preferably 55 mph. In this regard, 55 mph is the speed limit on many expressways in the U.S. Additionally, in the example shown in FIG. 5, an increase from 55 mph to 60 mph caused a 9.3% drop in fuel efficiency from the fuel efficiency level of 55 mph. In contrast, an increase from 50 mph to 55 mph only caused a 3.8% drop in fuel efficiency. In other words, the optimal speed limit for highway driving may be determined at least in part by the slope of the change in fuel economy with speed. Additionally, it should be noted that some vehicles will have more than one peak in fuel efficiency relative to steady-state speed. Thus, one peak may be available for determining the city driving speed threshold (e.g., 40 mph), while another peak may be available to help determine the highway driving speed threshold. Additionally, it may be beneficial in some embodiments to enable the driver to separately set the thresholds for city and highway driving in both the fuel economy and higher fuel economy modes. For example, if a driver regularly travels on an expressway with a speed limit of 70 mph, then 65 mph may be an appropriate threshold to help ensure smooth traffic flow while reasonably conserving fuel.

Of course, as indicated earlier, every vehicle model has its own unique fuel efficiency characteristics or profile. Indeed, there can be fuel efficiency variations between vehicles of the same model, due to such factors as the choice of axle ratio and whether or not a roof rack is present. Furthermore, the fuel efficiency will be impacted by the amount of passenger and/or cargo load being carried, as well as other factors such as wind speed. These factors may require a change in one or more of the trigger thresholds that determine when coaching feedback is provided through apparatus 12. As illustrated in FIG. 1, the powertrain control module 20 and the transmission control module 20a (if separate) receive input from quite a number of sensors as they seek to achieve the best balance of performance and efficiency in response to the speed or acceleration demand from the driver, as expressed through the accelerator pedal. Many of these inputs are also available on the CAN bus and through the OBD-II port for use by microcontroller 14 to adjust the trigger thresholds as needed. However, it should be appreciated that the vehicle operator's ability to adjust the position of the accelerator pedal 18 will not nearly be as precise of an adjustment as can be made through computer control. Accordingly, the number of inputs needed to determine the trigger thresholds is relatively few. At a minimum, vehicle speed and a clock signal are required inputs in order for the microcontroller 14 to determine when to energize the motors 16 and 34. For example, the microcontroller 14 may include a lookup table stored in its program memory in which trigger thresholds are determined by a plot of vehicle speed against the acceleration rate. However, most preferably, engine load is also included as an input to microcontroller 14 to provide a more exact understanding of the fuel consumption rate of the engine. Engine speed is also preferably included, as engine fuel efficiency is typically mapped against engine speed and engine load during the engine calibration process. Additionally, an input from the transmission is also preferred, such as the current transmission gear employed. These additional inputs will increasingly enhance the precision of the haptic apparatus 12, but it should be understood that they may not be required for every embodiment. Similarly, the position of the accelerator pedal 18 or the throttle opening may also have utility, but such inputs are not generally necessary. In this regard, it should be noted that the ubiquitous accelerator pedal found in vehicles today could also be replaced with another form of accelerator control in the future.

Figure 6:
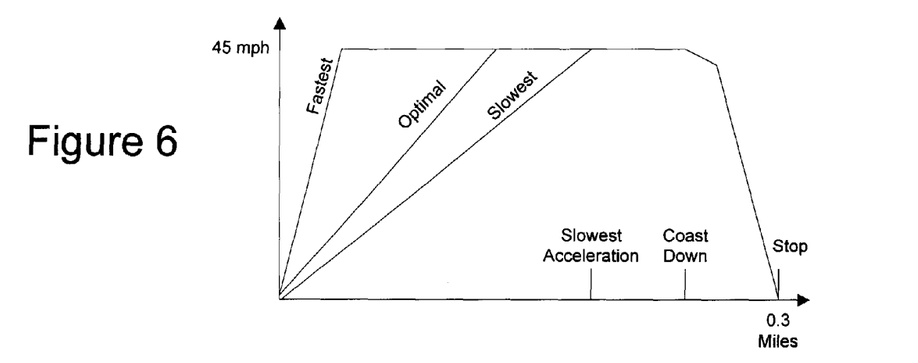
FIG. 6 is a graphical illustration of an acceleration test procedure.
Figure 7:
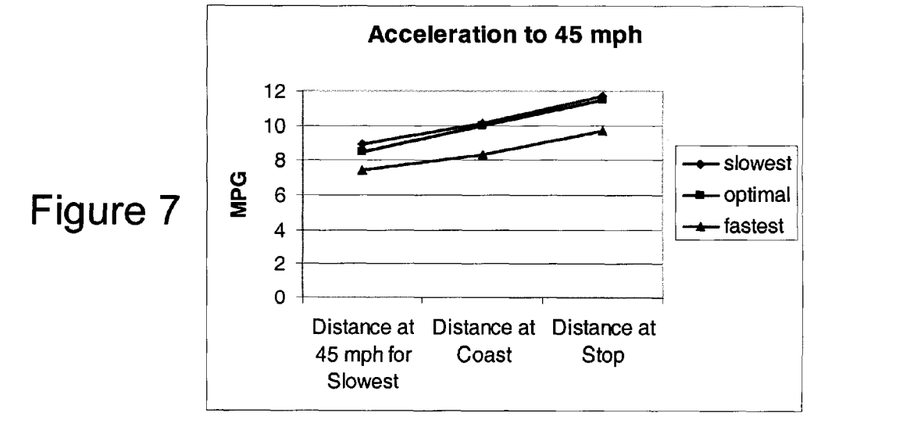
FIG. 7 is an exemplary graph of results from the acceleration test shown in FIG. 6.

Referring to FIG. 6, a graphical illustration of an acceleration test procedure for fuel economy evaluation is shown. According to this test, a vehicle is accelerated from zero to 45 mph, held briefly at 45 mph before coasting down and bringing the vehicle to a stop. Three fuel economy readings are taken during this process. Three levels of vehicle acceleration from this test procedure are shown in FIG. 7. Of course, the fastest acceleration results in the worst fuel economy, while the slowest acceleration results in the best fuel economy. However, most drivers may not wish to accelerate at very slow rate routinely. Accordingly, a beneficial acceleration rate is one, as shown in FIG. 7, which achieves fuel efficiency close to a very slow acceleration rate, yet is fast enough to be acceptable to most drivers. This rate may then be used as the acceleration threshold for the higher fuel economy mode of operation. This rate may also be determined by knowing when a powertrain event like the unlocking of a transmission torque converter will occur, so that the driver will not unknowingly cause powertrain events that decrease fuel economy. A greater acceleration rate threshold will be used for the fuel economy mode. This threshold should be selected to be below the level of acceleration (relative to vehicle speed) that would cause a kickdown of the transmission to a lower gear.

Figure 8:
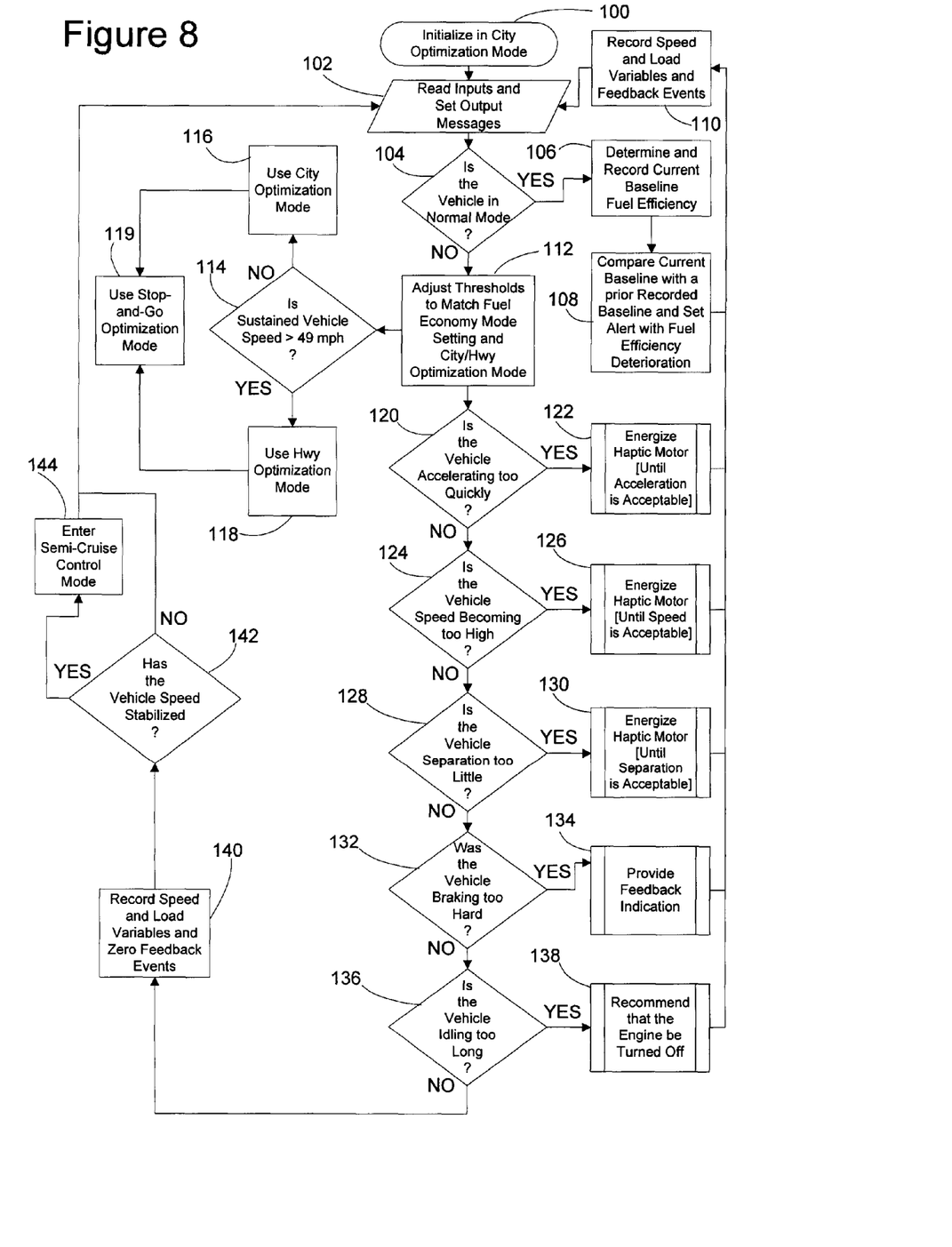
FIG. 8 is an overall flow chart of the coaching method.

Referring to FIG. 8, an overall flow chart of the coaching method is shown. During the initialization step 100, the city driving optimization regime will be assumed, as most vehicles will begin with city driving before highway driving. Then, the inputs discussed above are read at step 102. At this point, the microcontroller 14 will determine in step 104 if the apparatus 12 is in the normal vehicle operation mode where haptic coaching feedback is not provided. Nevertheless, even if the driver has selected the normal mode of vehicle operation, the apparatus 12 is still preferably active. As shown in steps 106-110, a number of functions are performed, such as establishing baseline fuel efficiency values for the specific vehicle, detecting whether fuel efficiency is deteriorating over time, and recording all of the values that will be needed for future reference.

In the event that the driver has selected one of the fuel economy modes, the appropriate trigger thresholds will be chosen in step 112 to correspond to the fuel economy mode selected and the driving optimization regime or mode. In this regard, an exemplary subroutine for this process is shown to the left. Specifically, for example, if the vehicle speed has exceeded a predetermined threshold for a predetermined amount of time, as shown in decision step 114, then the highway optimization mode 118 will be used. Additionally, it is possible for a driver to encounter stop-and-go traffic in either a city or highway driving condition. Accordingly, in one exemplary embodiment, a stop-and-go driving optimization mode 119 is preferably employed. In this mode, a vehicle acceleration rate threshold is employed that will encourage the driver to leave at least a separation of five car lengths or more in the front. An appropriately slow acceleration rate and a greater vehicle separation will help avoid unnecessary braking force, as will be discussed in connection with FIG. 10.

The next decision is whether the vehicle is currently accelerating or is likely to accelerate at a rate that exceeds a threshold determined by the microcontroller 14. Assuming that the answer from step 120 is yes, then the microcontroller 14 will energize or otherwise activate the motor 16 to provide haptic coaching feedback to the driver in step 122. The natural reaction of the operator will be to back off the accelerator pedal 18, thereby decreasing the rate of acceleration. This decrease in acceleration will be detected in successive reading cycles and once the microcontroller 14 has determined that the vehicle acceleration is acceptable or soon will be acceptable, then the motor 16 will be de-energized. Alternatively, the motor 18 could be energized for a predetermined short period of time initially and later energized with at least one longer period of time after a reasonable delay, if the vehicle has not slowed or stopped accelerating. As another alternative, the motor 18 could be energized for a short period of time when the threshold for the higher fuel economy mode is crosses and again at the higher threshold for the fuel economy mode if the vehicle continues to accelerate. In this regard, it should be appreciated that different timing, amplification, frequency and pulsing techniques could be provided to achieve the coaching feedback needed.

Next, the microcontroller 14 will determine in step 124 whether the speed is too high relative to the fuel economy desired by the driver, as expressed through an input device like selector switch 30. For example, if the vehicle exceeds 55 mph in the highway optimization mode with the higher fuel economy setting, the microcontroller 14 will energize the motor 16 to provide haptic feedback in step 126. This haptic feedback could also be different than that provided for an acceleration that is too rapid. In this regard, for example, the feedback for acceleration could be a continuous vibration, while the feedback for speed could be a pulsed vibration.

Ironically, in many urban driving situations, a driver will not arrive to his or her destination any quicker by driving at a speed that is sufficiently high to cause poor fuel economy. For example, during a workday commute, a driver will typically encounter congestion on the expressway at some point that will render traveling at a higher speed up to that time pointless. As a specific example, assume that it is appropriate for the driver to travel at either 55 mph or 60 mph for 10 miles on an expressway before encountering stop-and-go traffic. By traveling at 60 mph, the driver will reach the stop-and-go traffic less than a minute quicker than he or she would by traveling at 55 mph. Even though 60 mph has a faster apparent speed to the driver, a very brief period of stop-and-go traffic will cancel out the initial time difference such that the overall travel time will be the same. With the use of GPS/navigation system 62 and the recording of past commutes along this path, the estimated travel time could be displayed to the driver for both the fuel economy and higher fuel economy settings. If these two times are the same or close, the driver will realize that he or she would only be wasting money and fuel by traveling at a higher apparent speed. Without the provision of GPS/navigation system 62, the microcontroller 14 could still be configured to provide such an estimate without route selection by the driver. But, in this case, a route/distance would have to be assumed given the time of travel and past trips at this time and day. By recording trip start times, stop times, distances traveled, and periodic speeds, the microcontroller 14 will be able to deduce the most likely trip being made. Thus, for example, assume that the driver starts the vehicle's engine at 7:12 a.m. on a Monday. If the majority of trips made on Mondays between the hours of 6 a.m. and 8 a.m. are roughly 20 miles long, then average trip information from these 20 mile trips could be displayed to the driver (e.g., on display 44a in FIG. 3), as well as the estimated travel times discussed above. The goal of providing such information is to encourage the driver to make judgments that will improve the fuel economy of his or her vehicle through a change in driving style. However, this information could be useful in other contexts as well. For example, the vehicle could automatically be pre-heated for a morning trip in the winter and/or pre-cooled for an afternoon trip in the summer in an environmentally-friendly way without requiring an instruction from the driver to do so.

Figure 9:
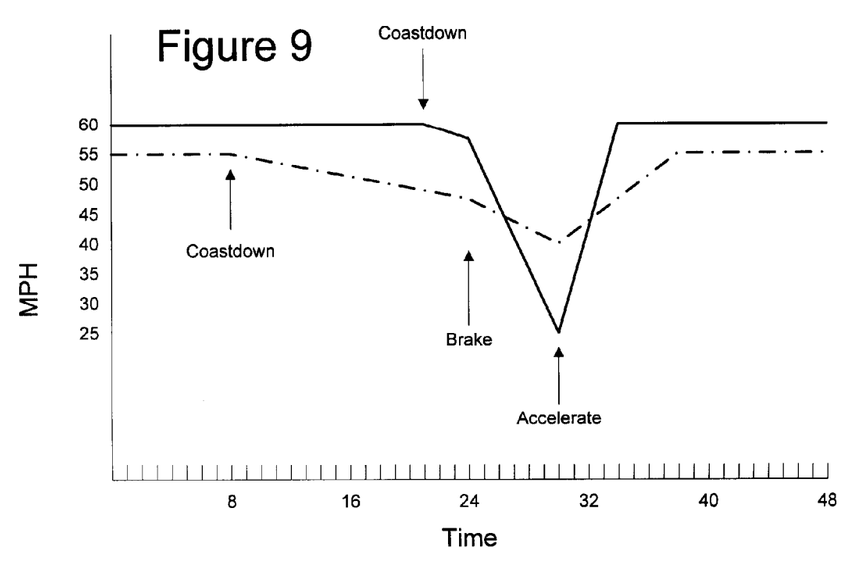
FIG. 9 is a graphical illustration of two speed curves that are useful in describing an aspect of the coaching method.

Assuming that the vehicle is equipped with the adaptive cruise control system 30, then the information will be available for the microcontroller 14 to determine whether there is sufficient vehicle separation to promote fuel economy in step 128 and provide a haptic alert or push-back through the accelerator pedal if there is not (step 130). In this regard, a healthy separation with respect to the vehicle in the front will enable the driver to slow down, but not have to stop in many driving circumstances. Conversely, a pattern of rapid braking (or rapid rate of deceleration) is inconsistent with a style of driving that promotes both driving safety and fuel economy. These diverging situations are illustrated by the two speed curves shown in FIG. 9. In a vehicle not equipped with adaptive cruise control, the microcontroller 14 may nevertheless determine that a pattern of insufficient separation is emerging. As illustrated in FIG. 9, a pattern of insufficient separation can be discerned from the amount of coastdown time permitted before a braking event and how rapidly the vehicle has then decelerated. For example, it may take 1-2 seconds for a driver to release the accelerator pedal 18 to its idle position and apply the brake pedal 36. Given that the coastdown rate of the vehicle can be stored in the associated memory of microcontroller 14, the coastdown time can be determined from the change in vehicle speed. Thus, for example, if the coastdown time is less than four seconds before braking, then the driver has left relatively little separation distance to the vehicle in front. This after-the-fact pattern recognition analysis may be conveyed by either a displayed message or haptic coaching feedback through the brake pedal 36. Similarly, the microcontroller 14 may also use a change in vehicle speed to determine that a pattern of excessive braking is emerging (step 132) and provide visual and/or haptic coaching feedback accordingly (step 134).

Even if the driver is otherwise operating the vehicle to achieve high fuel economy, excessive idling can reduce the fuel economy ultimately achieved. For example, restarting some vehicles may use less fuel than idling for more than thirty seconds. Accordingly, in vehicles not equipped with a stop-start system of operation, the microcomputer 14 will preferably recommend that the engine be turned off when a time threshold has been exceeded, as shown in steps 136 and 138. An exemplary time threshold may be two minutes. Given that the vehicle is stopped, this recommendation could be conveyed via display 44 or 60, as well as via haptic feedback through the brake pedal 36.

Whether or not any of the thresholds discussed above have been crossed, steps 110 and 140 indicate that the variables needed in future reading cycles (e.g., vehicle speed and acceleration), will be recorded. Additionally, step 142 indicates that the microcomputer 14 will preferably determine whether or not the vehicle speed has stabilized; that is, a situation in which it is clear that the driver is trying to maintain a steady vehicle speed. While the driver could optionally engage the vehicle's cruise control system at this point, step 144 shows the advantageous provision of a semi-cruise mode. Unlike a normal cruise control mode where the driver may remove his or her foot from the accelerator pedal 18, the semi-cruise mode need not be perceptible to the driver. In other words, the driver will still have his or her foot on the accelerator pedal 18 to the same extent, but the microcontroller 14 will use the cruise control system to prevent inadvertent pedal movements by the driver from adversely affecting fuel economy. Thus, for example, if the driver slightly depresses the accelerator pedal further, such that a one or two mile per hour increase would normally occur, such an insignificant speed increase will be prevented if fuel economy would be appreciably diminished. Once the driver commands a vehicle speed increase above this threshold level, the vehicle will again be permitted to accelerate as usual.

Figure 10:
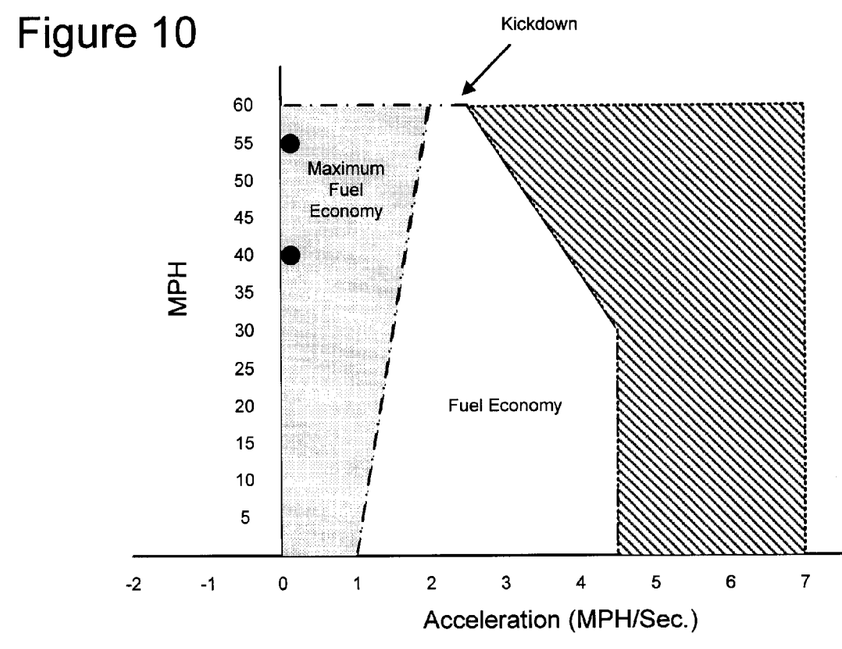
FIG. 10 is a graphical illustration of an exemplary lookup table structure.

Finally, FIG. 10 shows one example of a lookup table that could be employed by the microcontroller 14. FIG. 10 is intended to be generic and exemplary in nature, as each vehicle model will have its own particular fuel efficiency profile. In any event, it should be understood that fuel efficiency during acceleration is not constant across all appropriate vehicle speeds. While the fuel efficiency profile of a vehicle may be modeled from such standard calibration tools as a map of the fuel consumption rate against engine speed and load, a map of the transmission shift schedule against engine speed and vehicle speed, the vehicle itself may be tested to evaluate fuel efficiency across various speeds, acceleration rates and loads to determine one or more lookup tables of specific threshold values for microcontroller 14. It should also be noted that the 40 mph and 55 mph vehicle speeds are highlighted in FIG. 10 and shown to be in slightly positive acceleration. This is to point out that the vehicle speed thresholds should be triggered in step 124 when the vehicle's speed is increasing.

Although particular embodiments have been described herein, it is to be understood that various modifications, alterations, and adaptations may be made by those skilled in the art without departing from the spirit and scope of the present claims, as well as those added or subsequently amended. Such claims, whether broader, narrower, equal, or different in scope to the original claims, are also to be regarded as included within the subject matter of the present disclosure.

What is claimed:

1. An aftermarket apparatus for encouraging improved vehicle fuel economy, comprising:
 a haptic actuator configured for mounting to an accelerator control assembly of the vehicle;
 a connector configured for removably coupling to a vehicle controller via a diagnostic port inside a cabin of the vehicle; and
 a controller in communication with the connector and the haptic actuator and configured to read a plurality of signals from the diagnostic port and energize the haptic actuator in response.

2. The aftermarket apparatus according to claim 1, wherein the controller is housed in a common enclosure with the connector.

3. The aftermarket apparatus according to claim 1, wherein one of the signals is vehicle speed and the controller also energizes the haptic actuator to encourage the driver to leave more distance for braking.

4. The aftermarket apparatus according to claim 1, further including a human-machine interface in communication with the controller to enable the driver to select between a plurality of fuel saving settings.

5. The apparatus of claim 1 wherein the plurality of signals form the diagnostic port are communicated over a controller area network.

6. The apparatus of claim 1 wherein the controller energizes the haptic actuator in response to a determination of vehicle fuel economy based on the plurality of signals.

7. The apparatus of claim 1 wherein the controller energizes the haptic actuator in response to exceeding an acceleration rate threshold.

8. An apparatus for encouraging a driver of a vehicle to improve fuel economy, comprising:
 a haptic actuator having a mounting clip to facilitate installation on an accelerator control assembly of the vehicle;
 a connector configured to be removably coupled to a diagnostic port inside a cabin of the vehicle; and
 a controller in communication with the connector and the haptic actuator and configured to read a plurality of signals from the diagnostic port and energize the haptic actuator.

9. The apparatus according to claim 8, wherein the controller is housed in a common enclosure with the connector.

10. The apparatus according to claim 8, wherein one of the signals is vehicle speed and the controller also energizes the haptic actuator to encourage the driver to leave more distance for braking.

11. The apparatus according to claim 8, further including a human-machine interface in communication with the controller to enable the driver to select between a plurality of fuel saving settings.

12. The apparatus of claim 11 wherein the human-machine interface comprises a selector switch.

13. A device for providing feedback to a vehicle driver, comprising:
 a haptic actuator adapted for mechanically coupling to an accelerator pedal of the vehicle;
 a plug adapted for removably connecting to a corresponding receptacle within a cabin of the vehicle to receive vehicle data; and
 a controller in communication with the connector and the haptic actuator and configured to energize the haptic actuator when the vehicle data indicates driving behavior that reduces fuel economy.

14. The device of claim 13 further comprising a human-machine interface in communication with the controller and configured to select a desired fuel economy range.

15. The device of claim 13 wherein the vehicle data includes vehicle speed and the controller energizes the haptic actuator when the vehicle speed exceeds a threshold.

16. The device of claim 13 wherein the haptic actuator includes a hook and loop fastener for coupling to the accelerator pedal.

* * * * *